United States Patent
Davies et al.

(10) Patent No.: US 7,304,911 B2
(45) Date of Patent: Dec. 4, 2007

(54) UNDERWATER LOCATION APPARATUS

(75) Inventors: Jonathan James Davies, Newburgh (GB); Shaun Michael Dunn, Newburgh (GB); Peter James Rapson, Newburgh (GB); Stephen Arthur Pointer, Newburgh (GB)

(73) Assignee: Qinetiq Limited (GB)

( * ) Notice: Subject to any disclaimer, the term of this patent is extended or adjusted under 35 U.S.C. 154(b) by 284 days.

(21) Appl. No.: 10/528,100

(22) PCT Filed: Sep. 17, 2003

(86) PCT No.: PCT/GB03/04001

§ 371 (c)(1),
(2), (4) Date: Mar. 16, 2005

(87) PCT Pub. No.: WO2004/027444

PCT Pub. Date: Apr. 1, 2004

(65) Prior Publication Data

US 2005/0249036 A1    Nov. 10, 2005

(30) Foreign Application Priority Data

Sep. 20, 2002 (GB) ............................ 0221833.7

(51) Int. Cl.
*G01S 3/802* (2006.01)
(52) U.S. Cl. .................................................. 367/125
(58) Field of Classification Search ............... 367/99, 367/120, 124, 127, 125, 100
See application file for complete search history.

(56) References Cited

U.S. PATENT DOCUMENTS

| | | | |
|---|---|---|---|
| 3,783,443 A | 1/1974 | Irick | |
| 3,978,445 A * | 8/1976 | Gravett | 367/125 |
| 3,992,692 A | 11/1976 | Filer | |
| 4,131,873 A | 12/1978 | Anderson | |
| 4,164,036 A | 8/1979 | Wax | |
| 4,198,704 A * | 4/1980 | Munson | 367/125 |
| 4,198,707 A | 4/1980 | Hampt et al. | |
| 4,312,054 A | 1/1982 | Holand | |
| 4,800,541 A | 1/1989 | Farmer et al. | |
| 5,070,484 A | 12/1991 | Mantel | |
| 5,185,725 A | 2/1993 | Kent et al. | |
| 5,331,602 A | 7/1994 | McLaren | |
| 5,377,162 A | 12/1994 | Jestin et al. | |
| 5,563,849 A | 10/1996 | Hall et al. | |
| 5,570,323 A | 10/1996 | Prichard et al. | |
| 5,659,520 A * | 8/1997 | Watson et al. | 367/125 |
| 5,724,047 A | 3/1998 | Clayton et al. | |
| 5,784,339 A | 7/1998 | Woodsum et al. | |
| 6,121,927 A | 9/2000 | Kalliojarvi | |

(Continued)

FOREIGN PATENT DOCUMENTS

GB     2 366 741     10/1999

(Continued)

*Primary Examiner*—Daniel Pihulic
(74) *Attorney, Agent, or Firm*—McDonnell Boehnen Hulbert & Berghoff LLP

(57) ABSTRACT

Measuring apparatus for providing information on the relative location of a target site which is radiating a target signal that includes a predetermined pulse signal, comprises receiver means for providing a pair of temporally spaced output pulses in response to a single received said predetermined pulse signal and cross-correlation means coupled to said receiver means for cross-correlating said pair of output pulses or signals derived therefrom.

23 Claims, 8 Drawing Sheets

U.S. PATENT DOCUMENTS

Figure 1:
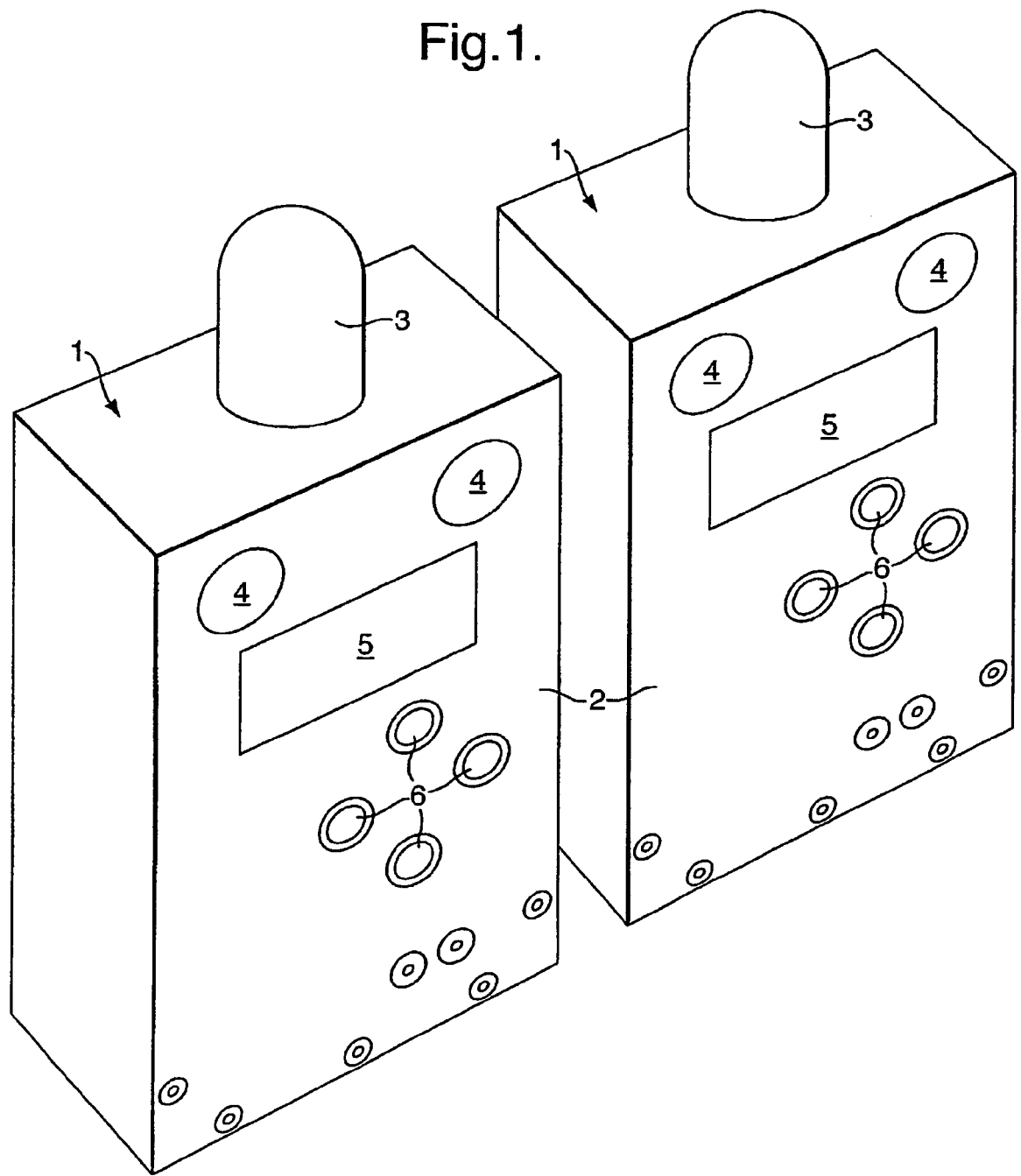

| | | |
|---|---|---|
| 6,160,758 A | 12/2000 | Spiesberger |
| 6,272,073 B1 | 8/2001 | Doucette et al. |
| 6,532,192 B1 * | 3/2003 | Reid .......................... 367/127 |

FOREIGN PATENT DOCUMENTS

| | | |
|---|---|---|
| WO | WO 02/082695 | 10/2002 |
| WO | WO 02/082696 | 10/2002 |

* cited by examiner

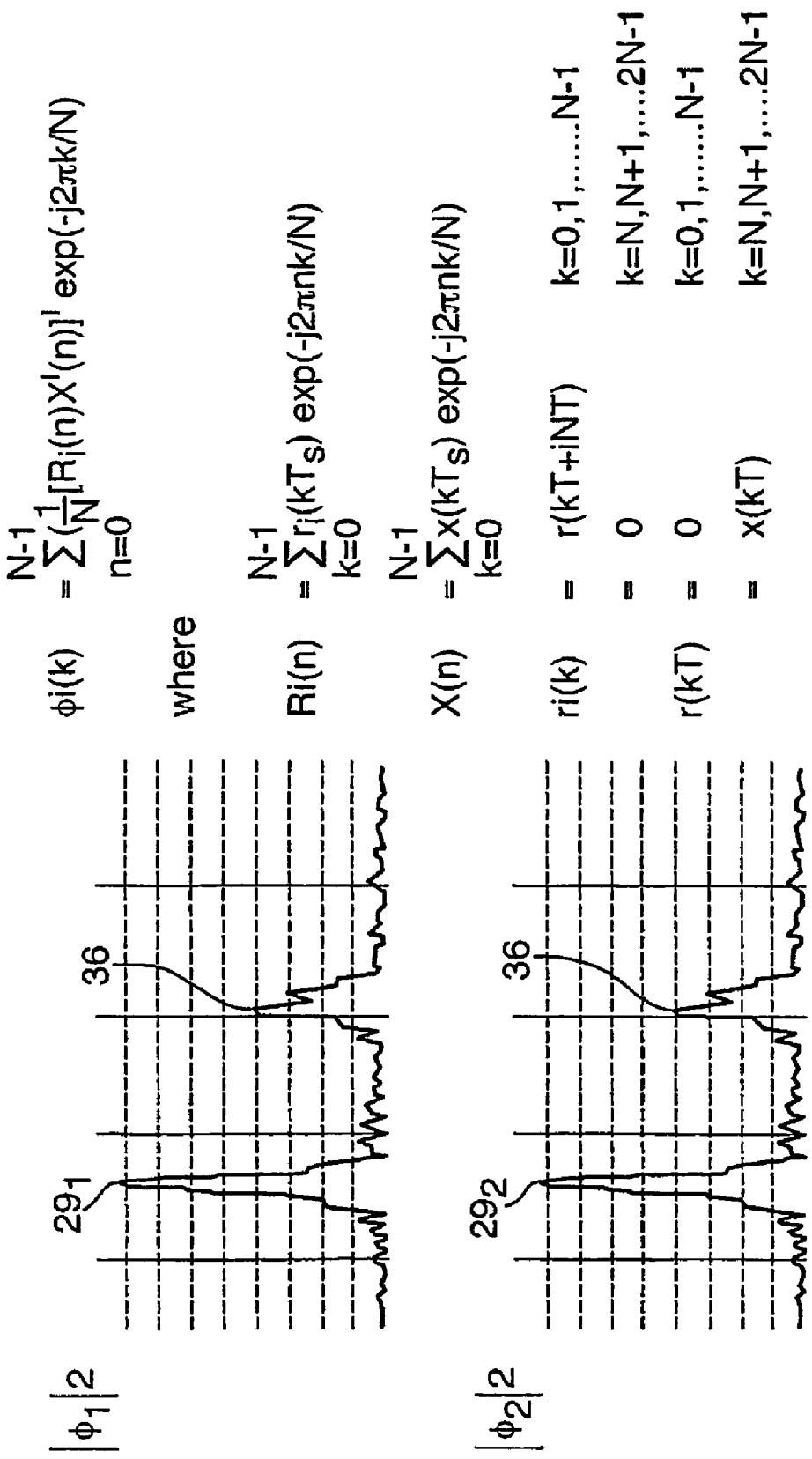

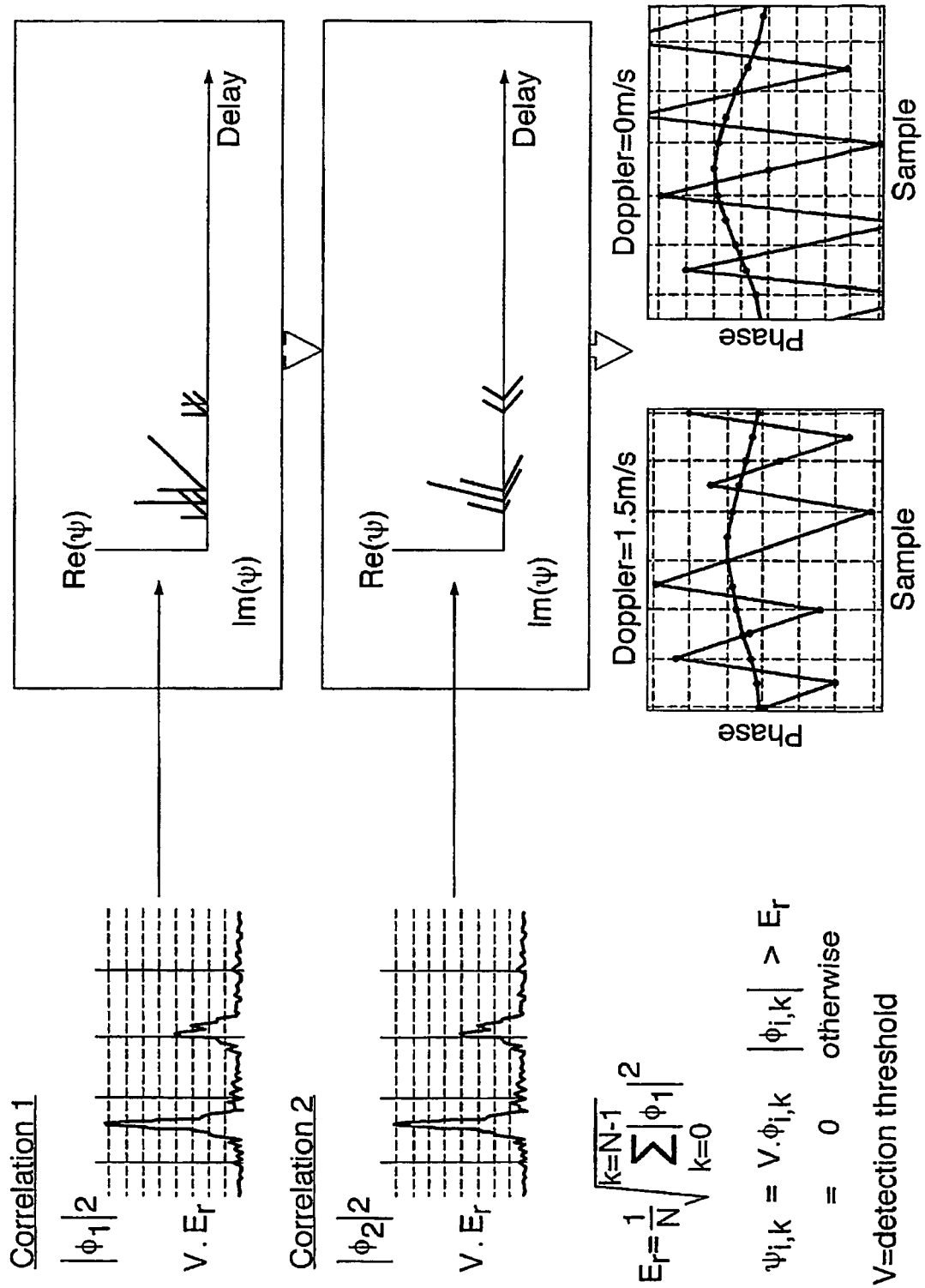

UNDERWATER LOCATION APPARATUS

The present invention relates to measuring apparatus for providing information on the relative location of a target site which is radiating a target signal. The apparatus may be readily portable, and is particularly useful underwater with acoustic signals, and the invention will be described in terms of such an apparatus which is useful for human diving operations. Nevertheless, the invention in its broadest aspect is not to be considered as limited to portable apparatus, nor to underwater apparatus, nor to acoustic radiated signals.

The detection and measurement of the range and bearing of underwater objects is a well established art. Thus it is well known to use passive sonar, in which a pulse of acoustic energy is radiated from a transmitter, passively reflected from any object within range, with the reflected signal being detected by a sensor, normally closely associated with the transmitter. In many applications, the acoustic transmitter and sensor are the same piece of hardware, but operated in different modes, i.e. a transponder.

Passive acoustic listening systems are also known, in which an object is detected, and optionally located, by virtue of the sound which it emits in its own right, or which it reflects from a natural sound source. Clearly this is not always a useful technique, although it has the advantage that acoustic attenuation is reduced in that acoustic transmission is only in the direction towards the detector. A passive sonar system can thus use it to the detriment of another active system which is emitting sonar pulses. Exemplary disclosures are U.S. Pat. No. 6,160,758 (Scientific Innovations, Inc.) which describes a method of localising signals utilising auto-correlation functions and cross correlation functions; and U.S. Pat. No. 4,198,704 (United States Of America, Navy) which describes a system for locating a radiating source in which the outputs of a plurality of mutually spaced radiation detectors are correlated. U.S. Pat. No. 3,978,445 relates to another such system in which the outputs of three hydrophones are cross-correlated.

Active sonar techniques have been progressively refined to give greater accuracy and reliability. However, reliance is placed on the object to be detected having a sonar response of a sufficient amplitude and a sufficiently characteristic sonar signature to enable identification of the type of object being detected and its range. Furthermore, there is often a considerable amount of clutter in the sonar return signal arising from multiple path propagation in both directions, and from reflections from other objects in the vicinity. There may also be other sources of noise which need to be filtered out if possible.

It is also known to provide active acoustic transmitting beacons to enable the detection and location of objects in the water, for example wrecks as in U.S. Pat. No. 4,312,054 (Farley) recoverable targets as in U.S. Pat. No. 3,992,692 (Filer) and U.S. Pat. No. 3,783,443 (Irick).

Active sonar systems are also known, in which an emitted acoustic pulse from an interrogating site is detected by a transponder, which reacts by transmitting a return acoustic pulse for detection at the interrogating site, with or without a predetermined delay. Exemplary disclosures are to be found in U.S. Pat. No. 6,272,073 (Doucette et al) for monitoring distance between divers; U.S. Pat. No. 5,570,323 ((Ascend Corporation) for monitoring range and bearing of a boat from a diver; U.S. Pat. No. 5,784,339 (Ocean Vision Technology) for position determination and message transmission using a plurality of concurrently transmitted signals in respective frequency bands; U.S. Pat. No. 5,331,602 (Hughes Aircraft Company) for tracking divers or other underwater objects and also sending messages thereto; and U.S. Pat. No. 5,185,725 (Dynamics Technology) using a respective unique identifying delay associated with each of a number of underwater transponders for determining range.

As indicated above, communication systems are also known where acoustic signals are actively transmitted in both directions between two underwater locations. One further such system is described in our copending International Patent Applications Nos. PCT/GB02/01517 and PCT/GB02/01510, and the reader is referred thereto for a brief discussion of yet other prior art systems.

Operation of the measuring apparatus of the present invention requires detection of a target signal radiated from a target site. In this sense it is akin to passive listening apparatus, since it merely listens for the transmission from the target site. However, signal transmission may alternatively be in both directions between a target site and the measuring apparatus, for example being initiated by a transmission from the measuring apparatus in response to which the target site radiates a target signal, making it more akin to active measuring apparatus.

The apparatus of the invention can provide an indication of the relative location of the target site, such as range and/or bearing, between the two locations. It may additionally be adapted so that messages or other information can be sent and received. For accurate measurements of location it is necessary to precisely determine the time of arrival of the signals, and to take into account the relative velocity between the first and second sites.

When transmitting acoustic signals underwater, the signals are prone to distortion from a number of sources. The Doppler effect can extend or shorten the duration of a signal, systematically alter its spectrum, and change the propagation time between a transmitter and receiver.

In addition, the acoustic signal commonly travels between a transmitter and receiver by more than one macro path, between which the transmitted energy is divided, normally unequally. If these paths are of unequal length, the signals will arrive at the receiver at different times. The plurality of received signals each have a reduced amplitude relative to single path propagation, and may interfere with each other, giving rise to fading. Commonly the division of energy between the different paths varies relatively slowly with time, so that any fading or reinforcement of the received signals is also variable. In addition, each macro path undergoes relatively rapid fluctuations which give rise to an additional blurring of the received signal relative to the transmitted signal.

It will therefore be understood that making an accurate measurement of the time of arrival of an acoustic signal can be difficult, and that the validity of any measurement dependent thereon can be correspondingly doubtful.

It is well known that if two range measurements of an object are made by a sonar technique using two spaced receivers, an indication of the bearing of the object can be obtained by triangulation. More precisely, the result is a cone of directions with the cone axis being coincident with the line joining the receivers. The intersection of any given plane and the cone will provide two possible bearings in that plane, and this ambiguity may be resolved by making a subsequent measurement when relative movement has occurred between the receivers and the object. One exemplary alternative way of resolving the ambiguity, and of providing a full indication of direction is to provide a third receiver lying off of the axis joining the other two, so that it is then possible to generate two cones of directions from two different pairs of the receivers which in general will coincide along a single direction, viz. the bearing of the object in three dimensional space. Clearly more than three receivers may be employed if desired.

Triangulation works well when the receivers are relatively widely spaced. Any errors in the measured ranges due to Doppler and other effects described above may give a degree of error in the range figures, but often this is sufficiently small relative to the absolute ranges to be acceptable in its own right and also so that the resulting error in the bearing measurement is also acceptably small.

However, when the receivers are relatively closely spaced, for example in a measuring apparatus which is hand held or worn by a diver, errors in range measurements have a much larger effect on any bearing measurement derived therefrom by triangulation, to the extent that the bearing measurement may be highly unreliable. It follows that steps are required to render the range measurements much more accurate, and/or to obtain a bearing measurement from the received acoustic signal in some other way.

It is in fact possible to gauge bearing from the time difference TDOA in the outputs of the different receivers in response to a single pulse, and their relative spacing, without involving range at all, particularly when the receiver spacing is relatively small so that the signals therefrom retain a good degree of correlation (in this context the degree of decorrelation increases more with vertical spacing than with horizontal spacing). Under these circumstances the predominant factor influencing TDOA is the inclination of the axis joining the receivers to the target direction, and the receiver spacing; any errors in the measurement of absolute propagation times between target and receivers would be expected to be common to both receivers, and any differential error because of the different in path length between the receivers would be expected to be vanishingly small.

Nevertheless, particularly when the receivers are closely spaced as in a measuring unit which is worn or carried, the time difference is correspondingly small, and any small error in measuring the time difference will still result in a relatively large error in the measured bearing. The ability of the measuring apparatus to resolve directions also increases with the bandwidth of the transmitted signal.

In a first aspect, the present invention provides measuring apparatus for providing information on the relative location of a target site which is radiating a target signal that includes a predetermined pulse signal, the apparatus comprising receiver means for providing a pair of temporally spaced output pulses in response to a single received said predetermined pulse signal and cross-correlation means coupled to said receiver means for cross-correlating said pair of output pulses or a pair of signals derived therefrom, and information generating means coupled to the output of the cross-correlation means for generating a signal containing said information.

The precision of the information derived from the cross-correlation means depends upon the form of the signals supplied thereto. One embodiment of the invention is an adaptation of the communication system described in our copending International Patent Applications Nos. PCT/GB02/01517 and PCT/GB02/01510 mentioned above, which employs a pulse sequence comprising an initial relatively wideband pulse signal followed by a string of digital pulse sequences having good autocorrelation properties. As particularly described the initial pulse signal is a double chirp, the first digital pulse sequence is predetermined, and the remaining pulse sequences are used to encode variable information for communication purposes. The bandwidth of the digital sequences should be sufficient for satisfactory resolution of direction.

In the communication system, the initial pulse signal is used to provide initial estimates of Doppler and (optionally) multi-path propagation, which are used in processing the predetermined digital pulse sequence. The processing of the predetermined digital pulse sequence then provides refined estimates of Doppler and (optionally) multi-path propagation for the processing of a subsequent digital pulse sequence, and so on in an iterative manner.

The Doppler information is employed to resample the received signal prior to other processing, so as to remove the effects of Doppler. The multi-path information is used to effectively synchronise the same emitted signals received via at least two different length paths, to increase the signal to noise ratio, in a process known as "raking".

The initial pulse signal, which is chosen as relatively wideband to aid detection, is subject to correlation with a replica of the transmitted initial pulse signal to provide the multi-path information, and the two chirps are then cross-correlated to provide Doppler information.

Similarly, the digital pulse sequences are correlated against replicas of the transmitted sequences to identify the particular transmitted sequence, and to provide more refined multi-path information for use in processing a successive sequence. Cross-correlation of the correlation result of one sequence with the correlation result of an immediately preceding sequence (or, for the predetermined digital sequence, the result of the preceding chirp) also provides more refined Doppler information for use in processing a successive sequence.

The relatively narrowband digital pulse sequences provide the communication with a selectivity that enables reliable identification of the transmitted variable information under conditions where it might otherwise be lost or misinterpreted, for example where the transmitted signal strength is low, or there is a high noise level. The system is adapted to deal with situations where there is substantial multi-path propagation and/or Doppler which tend to blur and distort the received signal.

The present invention can similarly utilise the processing of the initial pulse signal to provide a measure of Doppler and multi-path information. In particular, the Doppler information can be used to provide a corrective factor $\Delta T$ in the measured timing of received pulses when determining the range of the target by any known sonar technique, and in such a case it is the reception of the chirp pair at a single or first receiver which may be considered as providing the pair of temporally spaced output pulses.

However, the relative effect of Doppler on acoustic range measurement underwater is commonly small, and can often be ignored, particularly for example in circumstances such as a diver operating from a boat in calm water, where one of the diver and boat provides the target and the other includes the measuring apparatus of the invention. In the case of chirps, the longer the chirp and the higher the centre frequency, the greater is the range ambiguity. Of course in other cases case, e.g. where measuring with another form of radiation, or out of the water, the relative effect of Doppler could be significant.

Often of equal or greater importance is the need to know the direction of the target, and for this the difference in time of reception TDOA of the predetermined pulse signal at the measuring apparatus at a plurality of positions needs to be ascertained. Accuracy in TDOA is highly important where the different are closely spaced, for example where the measuring apparatus is small and carried by a diver.

Preferably therefore the apparatus of the invention comprises at least two spaced receivers for providing the pair of temporally spaced output pulses in response to a single received predetermined pulse signal from the target. A direction determining means may receive the two spaced output pulses for providing a direction signal determined by the pulse temporal spacing and receiver physical spacing.

In theory, it would be possible to provide the two output pulses from reception of the initial pulse signal at the spaced receivers. However, particularly in situations where the receivers cannot be spaced sufficiently far apart to give a large time resolution, the accuracy of the bearing measurement may be affected. For instance, if the outputs of two spaced receivers responding to the initial pulse signal are cross-correlated, the resulting information has a relatively high degree of ambiguity associated therewith, and a corresponding high uncertainty in the measured time difference TDOA, rendering any bearing information correspondingly uncertain.

Accordingly, when measuring bearing information it is preferred to provide the two output pulses from the detection of one of the digital pulse sequences. More preferably, and more generally (since in the measuring apparatus per se there is no requirement to send variable message information), it is preferred to use the first, predetermined, digital pulse sequence. Nevertheless, in a system where the digital pulse sequences are identified, as in the communication system of our copending applications, any of the digital pulse sequences could be similarly processed to provide bearing information.

When the outputs of two spaced receivers responding to this digital sequence are cross-correlated, the associated ambiguity function is significantly smaller and more localized (lower sidelobes) relative to that from the initial pulse sequence, leading to increased accuracy in the time differential measurement, and so in the bearing information. Of course, in the embodiment, the initial pulse signal still has a part to play in providing the initial Doppler (and optionally multi-path) information for preliminary processing of the received predetermined digital pulse sequence, just as correlation and cross-correlation of the predetermined digital pulse sequence are still employed to provide Doppler and multi-path information for the processing of a following digital pulse sequence.

In this respect it is noted that the result of the cross-correlation of the digital sequence is improved it the apparatus of the invention is arranged to take account of Doppler and/or multiple path propagation, and preferably both. It is well known that this information is present in the received digital pulse sequence and can be derived therefrom by (for example) autocorrelation and cross-correlation techniques without involving the initial pulse signal, particularly if the digital sequence is predetermined. However, this requires multiple Doppler bank correlators, it is computationally expensive, and the associated size and energy requirements would make it unsuitable for apparatus which is worn or carried by a diver for example.

Nevertheless, because of the distorting and weakening effects of Doppler and multi-path propagation, this is likely to be computationally difficult and unreliable. Thus even in apparatus where measurement of bearing is the sole consideration it is preferred to employ a predetermined pulse signal in which an initial pulse signal precedes the digital pulse sequence, the relevant information from the received initial pulse signal being used for initial processing of the digital pulse sequence from each receiver before it is operated on by the direction determining means. Because it is not directly involved in the time measuring process, the initial pulse signal does not need such very good correlation properties as the digital pulse sequence. It is preferably a wideband signal of simple form which is easily recognisable.

For providing more complete bearing information the apparatus of the invention preferably comprises at least three non-collinear receivers. The apparatus is arranged to retrieve respective direction signals from two different pairs of receivers selected from the at least three receivers, and to combine the different direction signals with the geometry of the receivers to provide the more complete nearing information. In an alternative embodiment (which effectively synthesises at least one further receiver), one receiver of a pair is movable relative to the other between at least two (or more) positions in a direction transverse to the line joining them, and the direction determining means is arranged to provide respective direction signals corresponding to the different positions, and to combine them with the related receiver positions to providing a more precise indication of the direction of the target site.

In a further variation, also generally equivalent to synthesising at least three spaced receivers, the apparatus according to the invention includes at least two receivers and rotation means for detecting rotation of the apparatus (or more pertinently the associated rotation of the axis joining the receivers), and the direction determining means is arranged to combine direction signals when the apparatus is in at least two different rotational positions and the output of the rotation means for providing a more precise indication of the direction of the target site.

The apparatus according to the invention preferably includes resampling means coupled for resampling the output of the receiver means in response to Doppler information. Preferably the latter is obtained from a cross-correlation means operating on the initial pulse signal, because the measurement is considered more accurate and reliable, particularly in conditions where the received signal is weakened and distorted. However, any other known way of obtaining the Doppler information can be employed—for example when the initial pulse signal includes a chirp, the Doppler may be assessed from its length or frequency characteristics, and when there are two spaced chirps (or other waveforms) the Doppler may be assessed from the pulse spacing.

Apparatus according to the invention preferably is arranged to measure both direction and range in the manner outlined above. Accordingly it is preferred that the predetermined pulse sequence comprises the initial pulse sequence followed by a digital pulse sequence.

While cross-correlation is employed for determining Doppler and times, the apparatus of the invention also preferably comprises correlation means for correlating a part of the resampled received signal with a replica of that part of the signal in the radiated predetermined pulse signal, to enable an assessment of multiple path propagation. The latter may then be used to "rake" the signal. Preferably the correlation means is located prior to the cross-correlation means.

The part of the signal which is correlated in this manner may be the initial pulse sequence, or the digital pulse sequence, and in the embodiment both parts of the signal are correlated.

The invention also provides measuring equipment which includes measuring apparatus according to the first aspect of the invention and further includes a target unit for emitting the target signal from a target site. Preferably the predetermined pulse signal comprises an initial pulse signal such as a frequency modulated waveform, e.g. a chirp. Preferably the initial pulse signal comprises at least two temporally spaced such waveforms, and even more preferably the waveforms are identical. Thus in the embodiment a pair of identical chirps are used.

Preferably the predetermined pulse signal comprises a digital sequence, and more preferably the digital sequence is preceded by an initial pulse signal as defined in the preceding paragraph.

More preferably, the digital sequence has good correlation properties for example being selected from a pseudo-random maximal length sequence, a Gold code or a Kasami code. A maximal length sequence has the more desirable autocorrelation properties, whereas a Gold code or a Kasami code has superior cross-correlation properties. Preferably the start and/or end (preferably both) includes a cyclic extension of the code.

The invention extends to a method of obtaining information on the relative location of a target site which is radiating a target signal that includes a predetermined pulse signal, the method including the steps of producing a pair of temporally spaced output pulses in response to a single received said predetermined pulse signal and cross-correlating said pair of output pulses or signals derived therefrom.

In range measurement, it is necessary to measure the time taken for the predetermined pulse signal to travel from the target site to the measuring apparatus. If the measuring apparatus is synchronised with the target site e.g. immediately prior to use, and employs a clock, and if the predetermined pulse signal additionally carries an indication of its time of transmission, then it is comparatively simple to determine the time of arrival of the predetermined pulse signal at a receiver of the apparatus of the invention, to correct the time of flight for Doppler effects, and to determine the range therefrom.

Alternatively, the measurement may be initiated from the measuring apparatus by radiation of an interrogation pulse signal, with target site responding by emitting the predetermined pulse signal, optionally with a predetermined delay. The round time, corrected for any optional delay, may then be corrected for Doppler prior to the conventional determination of range. The provision of a predetermined delay at the target site can prove beneficial in facilitating the gating out of false returns, for example from nearby objects or the water boundary (surface and/or bottom), and it also allows for any variation in the signal processing time at the target.

It is possible for the apparatus of the invention to measure the time of arrival of an initial pulse signal of the predetermined pulse signal. However, the improved temporal reliability and accuracy obtained from a received digital sequence for the purposes of obtaining a direction signal may be extended to the measurement of range. Here the output of a single receiver may be used, with the resampled digital sequence being correlated against a replica of the transmitted sequence, to provide a result from which the time of arrival can be reliably obtained in known manner. This is processed with the factor $\Delta t$ obtained from the initial pulse signal to correct for the effects of Doppler, and the range computed from the corrected time in any known manner.

Where there is the facility to transmit information between the measuring apparatus of the invention and the target site, whether or not by the addition of information to the predetermined pulse signal, the measurement of Doppler could additionally or alternatively be performed at the target site with the information transmitted to the measuring apparatus for use. Similarly, the measurement of bearing could be performed at the target site in a manner similar to that already described with respect to the measuring apparatus of the invention, with the information being transmitted to the measuring apparatus for combination with range information.

Figure 2:
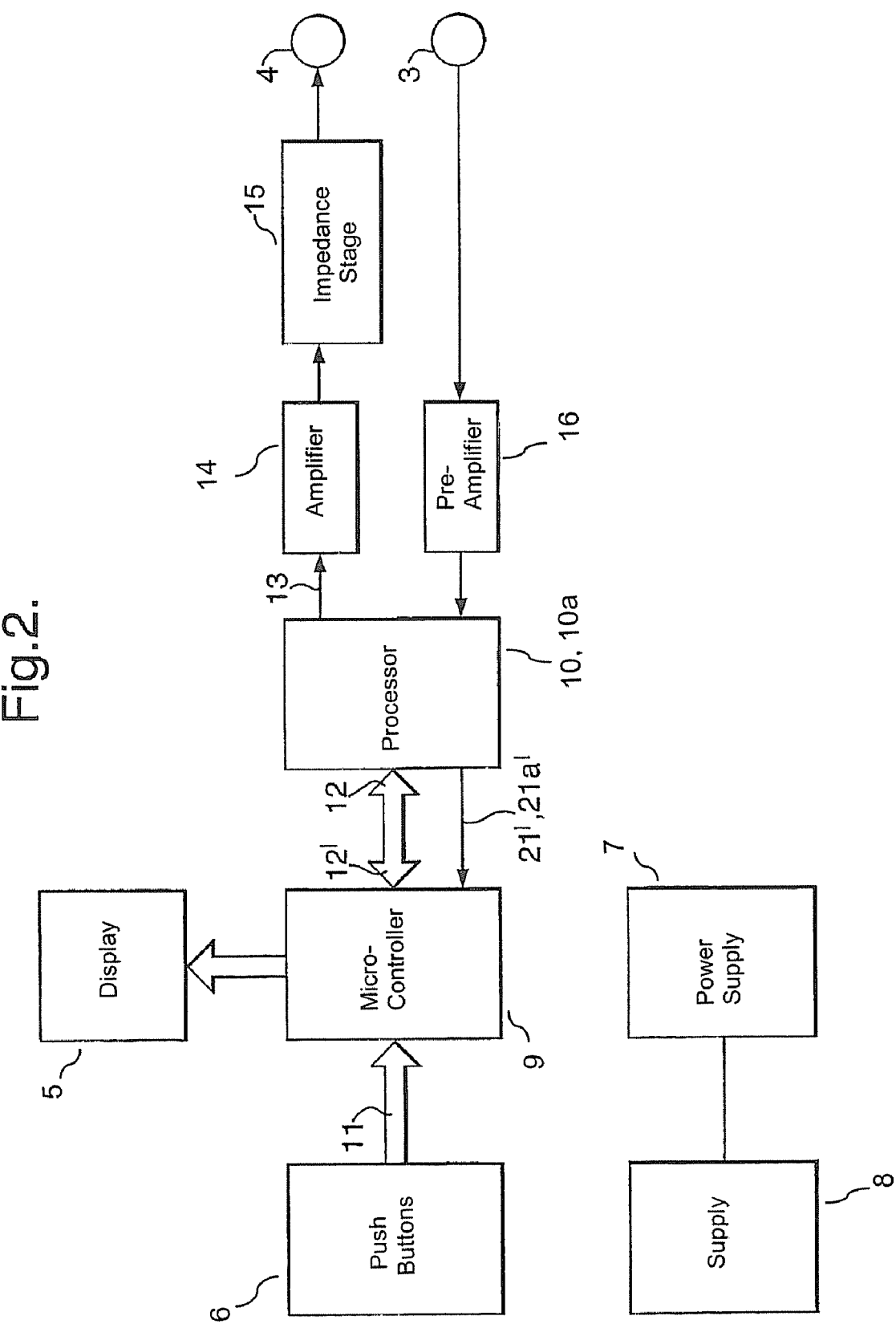
Figure 3:
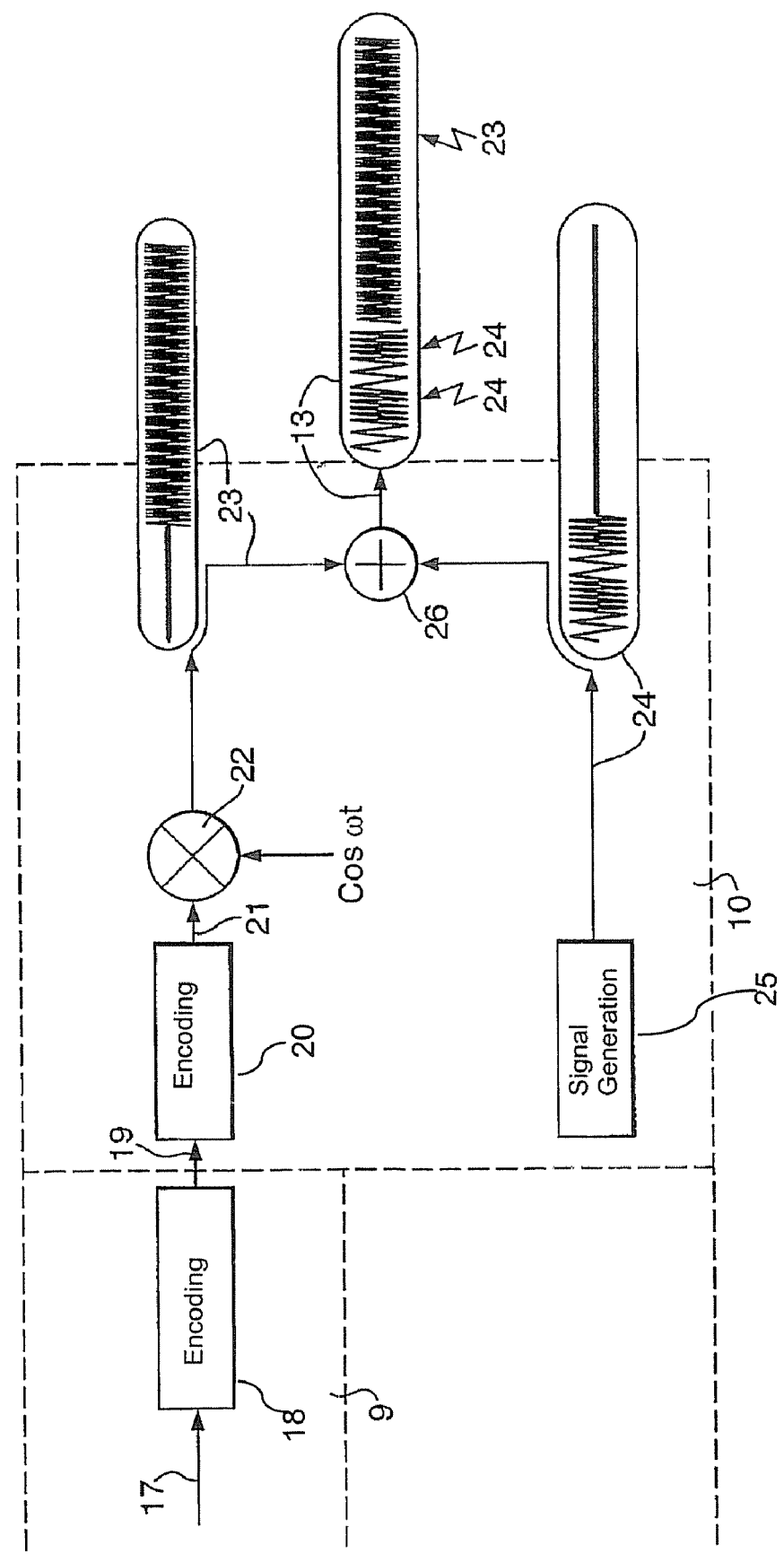
Figure 4:
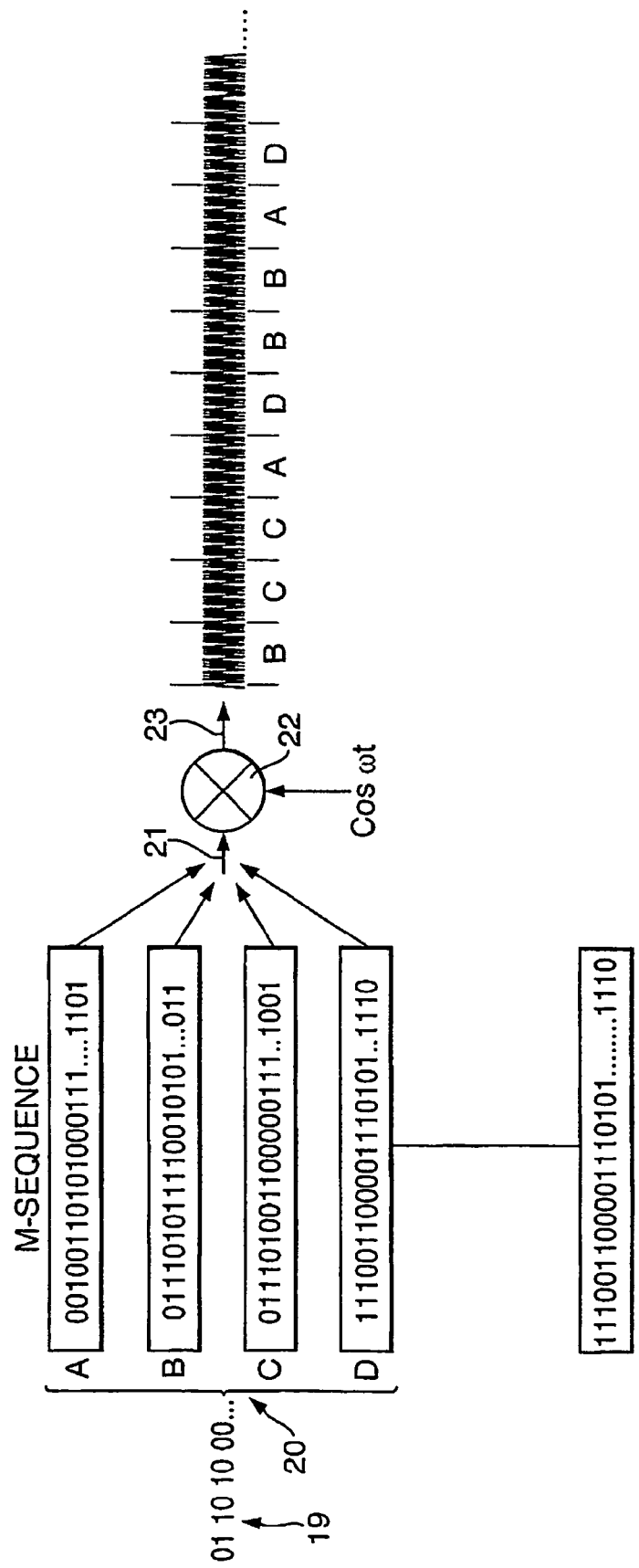
Figure 5:
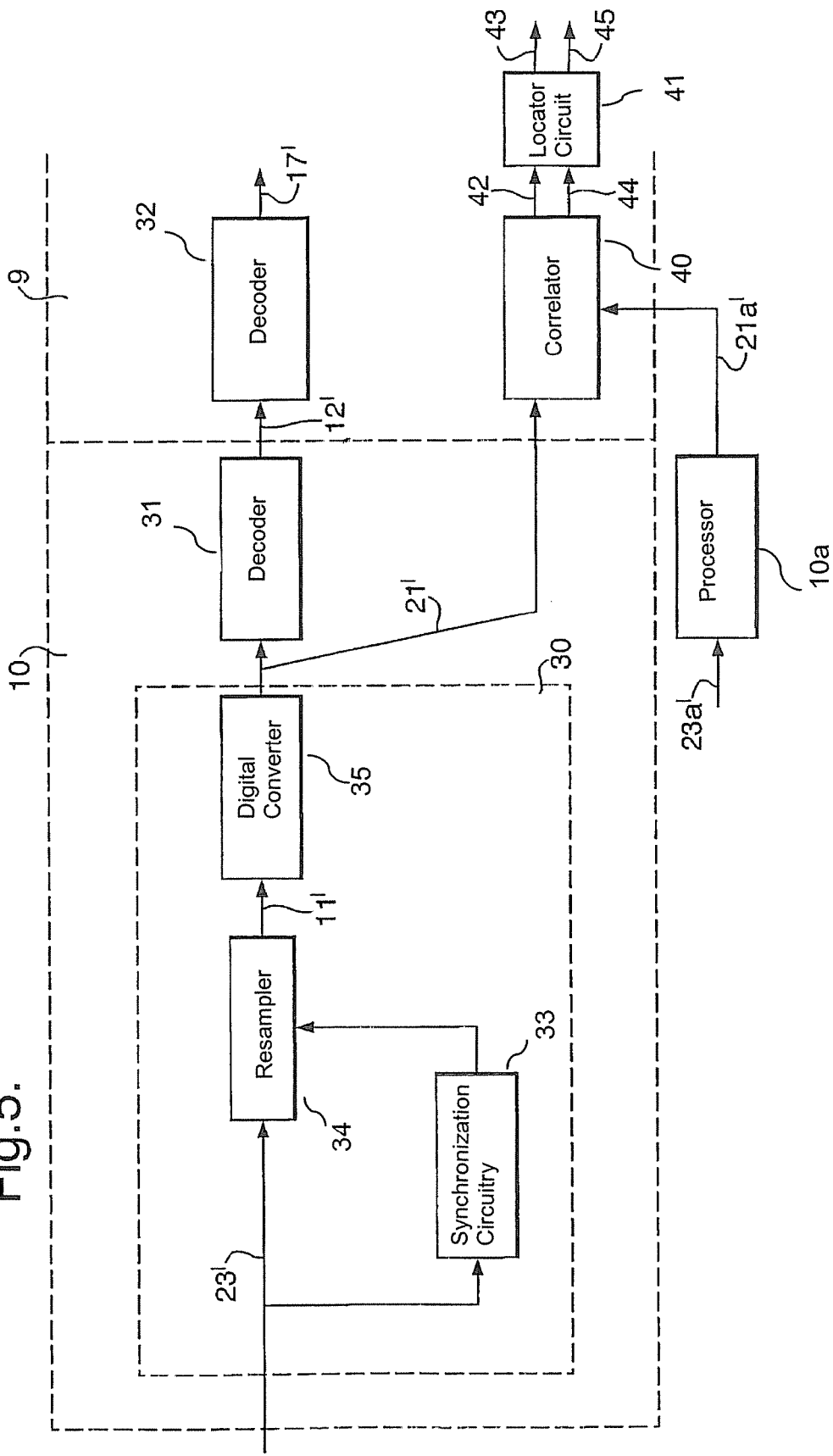
Figure 6:
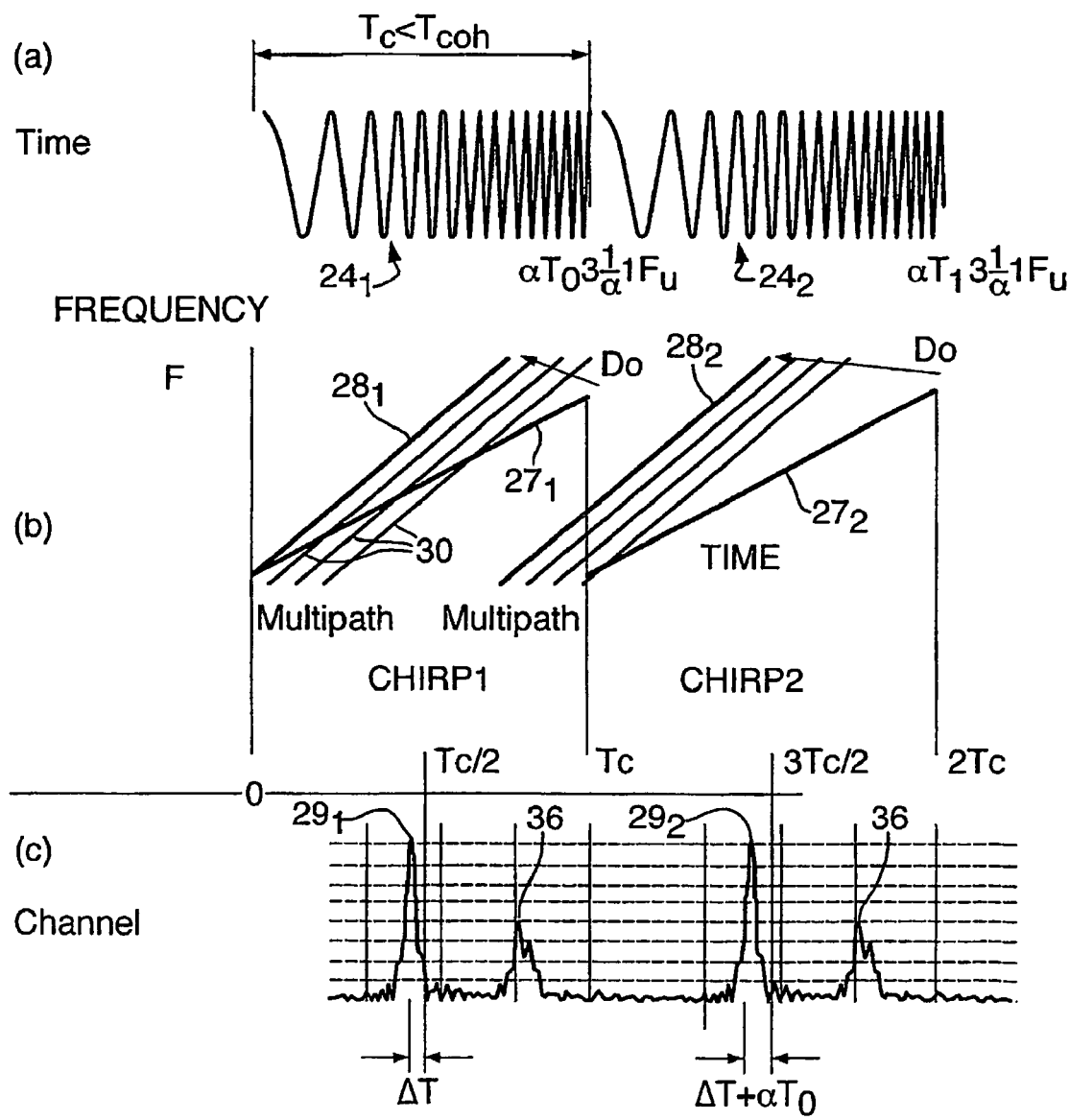

Further features and advantages of the present invention will become dear upon a consideration of the appended claims, to which the reader is referred, and upon a reading of the following description of an embodiment of the invention, in which:

FIG. 1 shows a frontal view of pair of transceivers 1 suitable for intercommunication between a pair of divers, or between a diver and a boat;

FIG. 2 schematically illustrates a block circuit diagram of circuitry within a transceiver 1 of FIG. 1;

FIG. 3 illustrates in partial schematic form the transmit side of a transceiver;

FIG. 4 schematically illustrates the working of a detail of the circuitry shown in FIG. 3;

FIG. 5 schematically illustrates part of the receive circuitry in the transceiver 1 of FIG. 1; and FIGS. 6 to 8 are plots to illustrate the operation of parts of the circuitry shown in FIG. 5, with reference to pulse waveforms in the form of chirps at the commencement of a transmitted signal.

The embodiment is a modification of the communication apparatus described in our copending International Patent Applications Nos. PCT/GB 02/01517 and PCT/GB02/01510, and with the exception of minor changes in FIGS. 2 and 5 the figures are identical. Accordingly the reader is referred to our copending applications further details in respect of the signal processing and communications side. Nevertheless a brief summary thereof is necessary and helpful in understanding the signal processing used to obtain location information.

FIG. 1 shows a pair of transceivers 1 for use by divers. Each transceiver comprises a metal casing 2 on one end of which is mounted a pair of spaced acoustic hydrophones 4 for receiving acoustic signals. A single acoustic transducer 3 for transmitting acoustic signals is mounted at the top of one major face of the casing, immediately above a window of a display 5. Below the window are four push button switches 6. The whole of the transceiver is designed to resist water ingress under pressures likely to be encountered during diving. Although separate transmitting and receiving transducers are shown, it is possible to provide a transceiving transducer or transducers which provide both functions.

FIG. 2 schematically illustrates a block circuit diagram of circuitry within a transceiver 1, operated by power supplies 7 driven from a supply 8. Driver input and display functionality is performed by a microcontroller 9 linked to a further dedicated processor 10. For transmitting variable data the microcontroller 9 receives input from the pushbuttons 6, with a corresponding output on the display, and in response thereto eventually provides a message 11 input to the processor 10 in the form of a Reed-Solomon encoded digital stream 12, which is converted by the processor 10 to a composite modulated signal 13, amplified 14, and impedance matched 15 to the transducers 4.

In the receive mode, the outputs from the hydrophones 3 are now separately preamplified 16 and separately input as signals 23', 23" to individual processors 10, 10a. These are generally identical except that processor 10 includes an m-sequence decoder 31 which proceeds to reconstitute the transmitted information sequence 12' (where used, the prime denotes a received signal which generally corresponds to a transmitted signal, and the suffix "a" refers to the second processor 10a). The output of decoder 31 is subject to Reed-Solomon decoding 32 and other processing in processor 9 as appropriate for control of the display 5 in response to the information contained in the received signal.

FIG. 3 illustrates in partial schematic form the transmit side of a transceiver. Conjoint operation of pushbuttons 4 produces in any known manner a message 17 in the form of a digital sequence of predetermined format. Message 17 is subject to Reed-Solomon encoding 18 in the processor 9 for error checking/correction at a destination transceiver. The resulting digital string 19, which is coupled to an m-sequence encoder 20, comprises symbols of length n bits, and is prefaced by an additional predetermined block of n bits (not shown) providing a predetermined digital pulse sequence. While the predetermined block is employed in the processing of the message, in the present invention it can additionally be employed for direction and/or range determination.

Each symbol is converted into a corresponding pseudo-random maximal-length sequence of length m chips (bits) (an "m-sequence") where m>n.

In the embodiment, the encoder 20 has stored therein $2^n$ extended m-sequences each of which comprises one of said $2^n$ m-sequences but prefaced and/or followed by a cyclic extension of x or y chips respectively. The x-bit extension is a repeat of the final x chips of the m-sequence. The y-bit extension is a repeat of the first y chips of the m-sequence. Either x or y may be zero and/or unequal, but it is preferred that both are finite and/or equal quantities (preferably both).

As schematically shown in FIG. 4 for the case where n is 2, giving rise to 4 extended sequences A, B, C and D, encoder 20 acts on the string 19 of symbols to select the corresponding extended sequence for forward transmission to a modulator 22 where it is bi-phase modulated to a suitable carrier frequency ω. Thus the input 21 to modulator 22 consists of a series of extended sequences, the first corresponding to the predetermined sequence mentioned above, and the rest determined by the message 12. Two chirp signals 24 of predetermined form length and relative timing are produced by a generator 25 and added at 26 at the front of the modulated signal 23 to produce the composite signal 13 which is coupled to the transducers 4 for transmission to another diver or a surface vessel, for example.

The additional predetermined block of n bits is similarly represented by a corresponding predetermined m-sequence. It lies between the extended sequences representing the message 12 and the chirp signals 24. In this embodiment the combination of the chirps and this m-sequence is the predetermined pulse sequence from the target.

The predetermined m-sequence can be provided in a variety of other ways, for example by the use of a separate generator, by arranging for encoder 18 to generate a predetermined symbol at the start of its encoding process, by arranging for encoder 20 to generate the predetermined extended sequence at the start of its encoding process, or by arranging the chirp generator 14 to produce both the chirps followed by the predetermined extended sequence.

The extended m-sequences employed by the encoder 20 each comprise a base pseudo-random maximal-length m-sequence of m chips, where m is significantly greater than n, and preferably m/n is at least 16, more preferably at least 32, and even more preferably at least 64 (the ratio m/n effectively defines the processing gain one achieves in the receiver correlators). In practice fairly large processing gains may be used to help overcome multipath and user interference. For this application the ratio m/n is 255/2, and a cyclic extension is provided at each end of length 20 chips, but these values are a matter of choice according to the transmission conditions likely to be encountered, computing power available, and other circumstances. Obviously this ratio impacts on the system data rate and it would be possible to reduce the ratio to provide higher data throughput. The base m-sequences are chosen to provide in known manner the best auto-correlation coefficients for their length, to facilitate identification thereof (and so of the corresponding n-bit symbol) and to reduce the amount of cross-correlation with others of the base m-sequences.

The signal 13 comprises the (non-spaced) sequence of chirp 1, chirp 2, $E_0$, $(Em)_x$, where chirp 1 and chirp 2 are the chirps 24, $E_0$ is the predetermined extended sequence modulated on the carrier and $(Em)_x$ is the series of extended sequences determined by the message 7 modulated on the carrier. Since as transmitted the duration of each of these items is known, their relative timings as transmitted is also known. After certain initial corrections and demodulation, to be described, it will thus be possible to break down a received signal into a like sequence.

FIG. 5 schematically illustrates part of the receive circuitry in the transceiver 1, where the portions 30 of processor 10, 10a (similar to 10 and not shown in detail) serve to effect the aforesaid initial correction and demodulation of the respective outputs 23', 23a" from the two receive transducers 3 to provide in each case a series 21', 21a' of received extended sequences.

The portions of the two signals 21', 21a' corresponding to the predetermined extended m-sequence $E_0$ (the "pair of temporally spaced output pulses") are fed to correlating means 40, which provides an output 42 indicative of the difference in timing TDOA between the two signals. Output 42 is coupled to a location determining circuit 41 which takes account of the hydrophone spacing in the transceiver and provides a direction signal 43, e.g. for selective display on the display 5.

The transceiver is adapted to transmit an interrogation pulse to the second transceiver which is adapted to transmit the target pulse in response, without delay. The correlating means 40 additionally serves to correlate the portion of only signal 21' that corresponds to the predetermined extended m-sequence $E_0$ the against a replica of the corresponding part of the signal as transmitted, to provide a second time output 44 indicative of the time of arrival of the predetermined extended m-sequence $E_0$. The signal is processed by the location determining circuit 44 together with the time of transmission of the interrogation pulse and generates a signal 45 indicative of the range of the target e.g. for selective display on the display 5. Doppler information from earlier processing stages is also supplied to circuit 44 for correction of the time of arrival of the predetermined extended m-sequence (or of the round trip time).

In correlating means 40 the correlation of the signal 21' against its replica (21) preferably precedes, and provides the input to, the cross-correlation with the signal from the second receiver. However, It is possible to perform the correlation and the cross-correlation on the same input signal. Similar considerations apply to the correlation and cross-correlation applied to the chirp pair—they may be sequentially performed, or both may be performed on the same input signals.

Here, for determining range, it is the pair of chirps which provides the "pair of temporally spaced output pulses" from a receiver. As already described, they are cross-correlated and the result used to provide a Doppler correction factor which may then subsequently be employed in any known manner for an accurate determination of range.

While FIG. 5 illustrates correlation of the signal 21' against its replica for determining time of arrival and hence range, it will be understood that any other signal related to the signal $E_d$ may be correlated against its replica in the transmitted signal for this determination. Thus, for example, the portion of signal 12' related to $E_D$ could be similarly employed for correlation against the signal 12, provided that the time between detection by the hydrophone 4 to the production of signal 12' is invariant. If necessary, this may be achieved by operating the various components of the signal chain in a synchronous manner.

Similarly, signals other than the pair of signals 21' 21a', for example signals 12' and 12a' (this would necessitate providing an m-sequence decoder also in processor 10a), may be cross-correlated against each other to provide the time difference necessary to determine direction. The necessary identity of transit time between arrival at the respective hydrophone and the cross-correlator may be achieved by making the two signal paths identical.

The following description is also found in our copending applications, but is included here for completeness.

Assuming initially that the transmitted signal is subject neither to Doppler nor multi-path propagation, it could be directly received demodulated and the chirps extracted to provide signals 21', 21" similar to that produced by the encoder 20, for subsequent decoding, at an rn-sequence decoder 31 followed by a Reed-Solomon decoder 32 to reconstitute the message as outputs 17', 17".

In such a case, the chirp signals and extended sequence $E_0$ would function merely to denote the start of a transmission, providing the timing whereby $(Em)_x$ may be split up into component extended sequences. In known manner in decoder 31 each component Em is passed through $2^n$ parallel correlators relating respectively to each of the base sequences, the outputs of which are compared to determine which bit pattern is to replace that extended sequence. The extended sequences serve to reduce the sidelobe levels when performing the correlation between the replica sequence and the received sequence which may have multipath. While the extended sequences could also serve to accommodate any jitter in the received signal, in practice jitter is accommodated by summing correlations at the time delays of the significant multipath components plus or minus one or two lags to allow for any jitter.

The top plot (a) of FIG. 6 shows the chirp signals 24 as immediately successive chirps $24_1$ and $24_2$ each of duration $T_c$, the first chirp commencing at time T=0. The middle plot (b) of frequency F against time T shows lines $27_1$ and $27_2$ corresponding to chirps $24_1$ and $24_2$ as transmitted, and, in the absence of Doppler and multi-path propagation, as received.

When Doppler is present, but without multi-path propagation, the received signal is effectively a version of the transmitted signal which is compressed or expanded by an amount and in a direction determined by the effective relative motion between source and receiver. The lines $28_1$ and $28_2$ of FIG. 6 (b) illustrate this for the two chirps when the Doppler is of a sense giving waveform compression. It will be seen that the plots 27 are effectively moved as broadly indicated by the arrows Do to give the plots 28 which are of shorter duration and rising to higher terminal frequencies, the amount and sense of the movement being indicative of the magnitude and sense of the Doppler effect. Also, since the two chirps $28_1$ and $28_2$ are immediately consecutive, the start of plot $28_2$ is displaced from $T_c$ by an amount and in a sense indicative of the magnitude and sense of the Doppler effect.

The magnitude of the complex correlation of the received signal against the original chirp waveform produces the signal shown in plot (c) of FIG. 6, where the main peaks $29_1$ and $29_2$ correspond to the plots $28_1$ and $28_2$ respectively. Instead of sharp peaks at $T_c/2$ and $3T_c/2$ which would be produced from the plots 27, the peaks 29 are somewhat broadened and occur earlier by amounts $\Delta T$ and $(\Delta T+\alpha Tc)$ respectively.

It is possible to gauge Doppler from the values of $\Delta$ and/or $\alpha$. However, as previously mentioned, in reality the received signal is also subject to multi-path propagation, as shown in the finer lines 30 of FIG. 6(b), representing sub-signals, which tends to render less precise the information gained from the main signal.

It is therefore preferred to generate and buffer the complex correlation result between the two received chirp signals and the original chirp waveform, to provide complex output signals $\phi_1$, $\phi_2$ as depicted by $|\phi_1|^2$ and $|\phi_2|^2$, FIG. 7, similar to those of FIG. 6(c). By inspection of the output signals (e.g. as stored in a buffer), and use of a thresholding function, a portion or selected time window is selected from the output signal. These portions are temporally centred on the times when the correlation outputs have their respective maximum values, and are sized to contain other significant signal peaks arising from multi-path propagation.

Subsequently a complex cross-correlation is performed of each selected portion against the other, as is illustrated in FIG. 8. This process, provides a more accurate determination of Doppler effect, and uses information not only from the main signal, but also from significant sub-signals occurring close in time to the main signal (under many conditions most sub-signals will arrive closely spaced from the main signal, and signals further temporally spaced therefrom will have relatively little energy).

In FIG. 5, the Doppler measurement and start of message information based on the chirps is derived in synchronisation circuitry 33 which provides an output for controlling a re-sampler 34 to which is coupled the output of the preamplifier 16. In this manner the received signal is converted to a (passband) signal 11' having a carrier at the frequency $\omega$ of the modulator 10, for demodulation or down conversion in a digital converter 35 to provide the signal 21'.

When multiple path propagation is taken into account, the correlated chirp signals may take the form shown in FIG. 7, where there is at least one additional subordinate peak 36 corresponding to a sub-signal (these also occur in FIG. 6(c)). As shown, the peaks are actually composite, with components corresponding to closely spaced micro paths which constitute a macro-path for the sub-signal in question, but the fine structure is conveniently ignored.

It is known to process multi-path signals to produce a reinforced main signal, and to increase the signal to noise ratio, or the veracity, of the main signal. One known method of so doing is to measure the timing between the subordinate signals and the main signal, and to control a filter such as a FIR filter so that the signals are effectively added. For example the filter may take the form of a tapped delay line into which the original signal is fed and from which signals are taken at controlled delays so that the various paths are brought into synchronism, the respective signal components being read and added together. The controlled delays may be variable. The general process is known as "raking".

While the channel structure information provided by the correlation at the synchronisation circuit 33 could be used for dealing with multi-path propagation (see FIG. 7), in the embodiment of FIG. 5 this function is left to the m-sequence decoder 31, as will be described later. Thus the signals 11', 21' from re-sampler 34 and converter 35 still retain the multi-path structure.

As previously noted, using the known relative timing between portions of the transmitted signal 21', blocks or sequences of length m in positions corresponding to the original (unextended—i.e. the extensions are ignored for this purpose) m-sequences are selected from the received and temporally corrected signal for correlation with the $2^n$ base m-sequences to determine the corresponding portion (symbol) of the signal 19'. and message 17'. If the correlators act directly on the signal 21' as received, their outputs in fact also contain information regarding the sub-signals, and if identification of the m-sequences is performed directly on these outputs, the sub-signal information can interfere therewith.

Therefore on the basis of the determined channel structure the signal 21' is subject to a filtering process within the decoder 31 which in principle is similar to that described above in relation to the FIR filter, so as constructively to add/synchronise signals with different times of arrival whereby to increase the signal to noise ratio and to reduce the effects of multi-path propagation, and the "filtered" outputs thus obtained are used for the aforesaid determination (by correlation) of the m-sequences. It is preferred that this filtering process is weighted based on the relative energies of the channel paths previously identified, a process sometimes known as maximum ratio combining (MRC).

This whole process is preferably carried out in both the time and Fourier domains as appropriate for ease of signal processing, and adds considerably to the robustness of the communication. Preferably, when calculating the channel structure the correlation processing is performed in the Fourier domain as this allows faster evaluation of the time lagged correlation result. After determining the significant path delays and their weights, the correlation processing reverts to the time domain, thus saving processing time since it is necessary to sum the weighted correlations for each path delay and for each possible sequence. So for $2^n$ sequences and P paths it is necessary to compute $P \times 2^2$ complex correlations. The largest correlation result from each of the $2^n$ sequences identifies the maximum likelihood transmitted symbol. When this has been identified then the system will re-compute the channel estimate by performing a Fourier domain correlation between the maximum likelihood symbol and the current received time vector. This resets the path delays and weights ready for the next received sequence. It inherently enables the system to track Doppler changes (timing drift) from sequence to sequence either due to imprecise initial Doppler estimation or from platform acceleration.

Thus far, fixed Doppler and multi-path propagation could be accounted for. However, both of these factors may vary over the length of a transmission, thus potentially importing errors, and as described in our copending applications the Doppler and multiple path propagation information may be continuously updated from symbol to symbol.

As has already been noted for the case of the two chirps 24, complex autocorrelation provides information on the channel structure, and a subsequent complex cross-correlation of the autocorrelation results against each other provides information concerning Doppler. This process can be carried forward to the use of the received extended sequences.

The first received extended sequence is known, and the Doppler is assumed to be that obtained by use of the chirp signals, so permitting re-sampling and demodulation of the first sequence.

The invention claimed is:

1. Measuring apparatus for providing information on the relative location of a target site which is radiating a target signal that includes a predetermined pulse signal, the apparatus comprising at least two spaced receivers for providing respective ones of a pair of temporally spaced output pulses in response to the same part of a single received said predetermined pulse signal, said receivers including a correlator for correlating received signals with replica signals to provide said output pulses, and a cross-correlator coupled to said receiver means for cross-correlating said pair of output pulses.

2. Apparatus according to claim 1 and including direction determining means for providing a direction signal indicative of the direction of the target site from the output of said cross-correlator and the spacing of said two receivers.

3. Apparatus according to claim 2 including at least three non-collinear receivers, and wherein the direction determining means is arranged to provide at least two said direction signals from different pairs of said receivers, and to combine said at least two direction signals for providing a more precise indication of the direction of the target site.

4. Apparatus according to claim 2 wherein one said receiver is movable relative to the other between at least two positions in a direction transverse to the line joining them, and the direction determining means is arranged to provide at least two said direction signals corresponding to said two different positions, and to combine said at least two direction signals for providing a more precise indication of the direction of the target site.

5. Apparatus according to claim 2 and including rotation means for detecting rotation of the apparatus, wherein the direction determining means is arranged to combine direction signals when the apparatus is in at least two different rotational positions for providing a more precise indication of the direction of the target site.

6. Measuring apparatus for providing information on the relative location of a target site which is radiating a target signal that includes a predetermined pulse signal that includes at least two pulse waveforms with a predetermined temporal spacing, the apparatus comprising a receiver for providing a pair of temporally spaced output pulses in response to said two pulse waveforms of said predetermined pulse signal, and a cross-correlator coupled to said receiver for cross-correlating said pair of output pulses or signals derived therefrom, and including a Doppler processor for determining Doppler parameters from the output of said cross-correlation.

7. Apparatus according to claim 6 and including a sampler for resampling the output of the receiver in response to the output of the Doppler processor.

8. Apparatus according to claim 1 for use with a target site which is emitting a said predetermined pulse signal that includes at least two pulse waveforms with a predetermined temporal spacing followed by a third pulse waveform providing said same part of said received signal.

9. Apparatus according to claim 1 including multiple path determining means for determining multiple path propagation of the received said pulse signal.

10. Apparatus according to claim 9 and including means responsive to the output of said multiple path determining means for effectively synchronising and adding said target signal which has been received over at least two different said multiple paths.

11. Measuring equipment comprising measuring apparatus according to claim 6 and further including a target unit for emitting a target signal from said target site.

12. Equipment according to claim 11 wherein said pair of waveforms are frequency modulated waveforms.

13. Equipment according to claim 11 wherein said pair of waveforms are chirps.

14. Equipment according to claim 11 wherein said pair of waveforms are identical.

15. Equipment according to claim 11 wherein said predetermined pulse signal comprises a digital waveform.

16. Equipment according to claim 11 wherein said pair of waveforms are followed by a digital waveform.

17. Equipment according to claim 15 wherein said digital waveform has good correlation properties.

18. Equipment according to claim 15 wherein said digital waveform is selected from a pseudo-random maximal length sequence, a Gold code or a Kasami code.

19. Equipment according to claim 6 and including range determining means for determining a range from the timing of the received target pulse signal, said range determining means being coupled to the output of the Doppler processor for correcting the range to take account of Doppler effects.

20. A method of determining the direction of a source of pulse signals, the method comprising receiving the same predetermined pulse at two spaced receivers to provide respective first and second outputs, correlating said first and second outputs against replica signals and cross-correlating the outputs of the correlation with replica signals with each other to determine the difference in time of arrival, and computing an angle relative to the line joining the receivers from the time difference and the spacing of the receivers.

21. A method of determining range of a target on the basis of the time of flight of signals transmitted between the target and a measuring unit, wherein the target provides a pair of pulses with a predetermined temporally spacing, the method including the step of receiving the temporally spaced pulses at the measuring unit, correlating one received pulse against the other and deriving Doppler information from the resulting signal, and using the Doppler information to correct the measured range.

22. A method according to claim 21 wherein the Doppler information is used to correct the time of flight prior to calculation of the range.

23. A method according to claim 20, wherein said first and second outputs are corrected for Doppler prior to correlation with a replica signal.

* * * * *